United States Patent [19]

Dimitri et al.

[11] 3,901,823

[45] Aug. 26, 1975

[54] AGGLOMERATING ACTIVATED CARBON

[75] Inventors: Mitchell S. Dimitri; Albert J. Repik, both of Charleston, S.C.

[73] Assignee: Westvaco Corporation, New York, N.Y.

[22] Filed: Nov. 18, 1971

[21] Appl. No.: 200,240

[52] U.S. Cl............... 252/428; 23/314; 260/124 R; 264/117
[51] Int. Cl.² ..................... B01J 21/18; C09C 1/58
[58] Field of Search ............... 264/117, 29; 23/314; 252/444, 421, 428; 423/460; 260/124 R

[56] References Cited
UNITED STATES PATENTS

| | | | |
|---|---|---|---|
| 2,228,976 | 1/1941 | Reboulet | 260/124 R |
| 2,648,637 | 8/1953 | Rodman, Jr. | 252/421 |
| 2,664,377 | 12/1953 | Van Beckum | 161/246 X |
| 2,850,403 | 9/1958 | Day | 23/314 |
| 3,077,439 | 2/1963 | Shea, Jr. et al. | 264/117 |
| 3,454,502 | 7/1969 | Hiltgen | 252/444 X |
| 3,533,961 | 10/1970 | Voet et al. | 23/314 |
| 3,544,507 | 12/1970 | Lloyd | 260/39 |
| 3,560,346 | 2/1971 | Gunter | 264/117 |
| 3,592,779 | 7/1971 | Kiikka | 252/421 |
| 3,637,464 | 1/1972 | Walsh | 264/117 X |
| 3,651,179 | 3/1972 | Shea et al. | 264/117 |
| 3,697,497 | 10/1972 | Falkehag | 260/124 A |
| 3,699,091 | 10/1972 | Dimitri | 260/124 R |

OTHER PUBLICATIONS

Kirk–Othmer, Vol. 12, 1969, pp. 372–381.
*The Condensed Chemical Dictionary*, 1966, pp. 58 and 556.

*Primary Examiner*—Robert F. White
*Assistant Examiner*—Thomas P. Pavelko
*Attorney, Agent, or Firm*—Richard L. Schmalz; Ernest B. Lipscomb, III

[57] ABSTRACT

Agglomerated activated carbon is prepared by treating activated carbon particles with a water-insoluble lignin binder. The binder is employed in amounts of from 2 to 25 percent by weight based on the carbon. The lignin binder and the carbon particles are mixed together with water to form pellets, then dried to form an agglomerated granular particle.

6 Claims, No Drawings

AGGLOMERATING ACTIVATED CARBON

BACKGROUND OF THE INVENTION

1. Field of the Invention

The invention relates to agglomerating activated carbon particles. More particularly, this invention also relates to a method for coating activated carbon particles with a lignin binder to bond the carbon particles together and the activated carbon products made therefrom.

2. Prior Art

Powdered activated carbon particles and dust from granular grades of activated carbon often present problems in handling. For instance, in mixing activated carbon with reclaimed rubber a large amount of dust is present. Ideally, the activated carbon for use with natural or synthetic rubber should be in the form of balls or pellets. It is also desirable agglomerate carbon particles for other uses, e.g., for filters, such as cigarette filters, air conditioning filters, heating plant filters, gas mask filters, and removal of hydrocarbons from gas streams, such as in automobiles.

Unfortunately, most binder systems do not satisfactorily bond the activated carbon particles together and those binders which do have sufficient bonding properties seriously deteriorate the adsorptive capacity of the activated carbon. A number of binder systems have been set forth in which to varying degrees aid in preventing the dusting of carbon. Among these binders are those set forth in U.S. Pat. No. 3,544,507 to Lloyd and U.S. Pat. No. 3,352,788 to Conlisk.

It is the general object of the present invention to produce a treated activated carbon which substantially reduces dusting of the carbon particles without losing effectiveness. Another object of this invention is to bond activated carbon particles together without unduly impairing the surface area of the particles thereby inhibiting their adsorptive capacity. A further object of this invention is to provide a granulated activated carbon composition which is as effective an adsorbent as the powdered particles from which it was made.

Other objects, features and advantages of this invention will become apparent from the detailed description set forth below.

SUMMARY OF THE INVENTION

It has been found that activated carbon particles coated with a binder which comprises an alkaline digested lignin in an aqueous solution are effective in bonding the activated carbon particles together and thereby prevent dusting. The lignin binders in solution are thoroughly mixed with the activated carbon particles and dried to substantially bond the particles together. The lignin binder is added in an amount of from 2 to 25% by weight solids based on the carbon, preferably from 10 to 20% by weight. The ammonium salt of lignin is preferred because upon subsequent heating after drying the salt may be broken down. Modified lignins may also be used. Those modified with hexamethylene tetramine are preferred because of their surface area. The coated, agglomerated particles greatly reduce the dusting of the smaller carbon particles. The bonded activated carbon may be made into sheets, cubes, rods, or other forms and can be employed as filters such as those of the types previously set forth, and in all other areas where activated carbon is conventionally employed. One further advantage of this invention is that the activated carbon treated in this manner is more easily wettable when hydrophylic lignins are used as binders; whereas, the untreated carbon heretofore required a surfactant to assist in wetting.

DETAILED DESCRIPTION OF THE INVENTION

The activated carbons contemplated for use in this invention are activated carbons produced from any source which are in a powdered form, and carbon dust from granular grades that have been abraded. Particular powdered carbons to which this invention is applicable include such commercially available activated carbons as Pittsburgh types RB, RC, BL and Westvaco's Nuchar, as well as other powdered activated carbons. Further, impregnated carbons can also be aided by this invention. The powdered and granular dusts usually have a mesh size below minus 100 mesh. Upon agglomeration the activated carbon pellets may vary, depending upon the amount of binder, water and mixing but in any event the diameter can be controlled. The thus agglomerated activated carbon particles can then be crushed, if necessary, to the desired size, which typically varies for about 4 to 60 mesh.

The advantages of lignin as a bonding agent for fibrous material are well known. Lignin is itself the natural binding agent used by nature for cellulosic fibers. Obviously, such lignin as it occurs in nature must be substantially insoluble in water, else the wood would disintegrate. Similarly, lignin free acids, isolated from raw wood without substantial degradation, are also insoluble in water. One of the main sources of lignin is the paper and pulp industry where lignocellulosic materials such as wood, straw, corn stalks, bagasse, and the like are processed to separate the cellulose or pulp from the lignin. The lignins that may be used in this invention are those obtained from the kraft and soda pulping processes, and are water insoluble. On the other hand lignins obtained from other pulping processes, such as the sulfite process, are water-soluble when separated from the cellulose by dissolving in the spent liquor and are present in this liquor as a lignosulfonate. Because of their water solubility lignosulfonates are unacceptable for use in this invention.

The problem which presents itself in connection with the use of lignin as a binder for activated carbon particles is how to bring about intimate dispersion among the particles. It has been found that the alkali lignin may be intimately mixed with the small carbon particles by use of the aqueous solution of the ammonium salts of the lignin acids or hexamethylene tetramine modified alkali lignin. After mixing or pelletizing with at least 70 percent water based on the total mixture, agglomeration occurs. The pellets are dried and the water of solution is evaporated, leaving the ammonium lignate or hexamethylene-tetramine modified lignin bonding the particles together. Upon further heating the ammonium lignate decomposes into ammonia and the water-insoluble lignin free acid form, thereby providing an intimate product which is coalesced and bonded by means of the thermoplastic lignin in the free acid form.

In accordance with this invention, those lignins obtained from lignocellulosic material without substantial degradation, which forms water-soluble ammonium salts, may be mixed with the carbon particles, as the aqueous solution of lignin binder. The binder may then be decomposed, if desired, to the water-insoluble acid form by heat to produce agglomerated activated carbon particles. Because polyvalent metal salts of alkali lignin are water-insoluble, they provide no answer since because of their insolubilty they do not coat the carbon particles and because when heated to decomposition they leave an objectionable residue.

The solution of lignin binder is prepared by dissolving alkali lignin in a selected solvent which may be evaporated, leaving a lignin salt which will decompose upon heating into a volative constituent and the lignin free acid residue. It is generally desired to prepare solutions of relatively high concentrations, more dilute solutions may be often taken advantage of, depending in part upon the conditions of treatment, method of impregnation, and upon the amount of lignin required for the degree of bonding desired. For instance, especially successful levels of binder solids are in the range of 10% to 25% solids content. The amount of binder solids mixed with the carbon particles is variable and may range from 2 to 25% by weight solids based on carbon weight, with 10 to 25% being preferred. The amount of binder, as long as it is within this range is not particularly critical. An aqueous solution of ammonia is the preferred solvent, but quaternary ammonium compounds, such as the tetralkyl ammonium hydroxides, may also be employed. One such method for making aqueous solutions of ammoniacal lignins is set forth in U.S. Pat. No. 3,117,115 to Webster. In addition to the ammonium lignate, an alkali lignin modified with hexamethylene tetramine may also serve as a binder. A method for making this modified lignin is set forth in U.S. Pat. No. 3,697,497, to Falkehag, which issued Oct. 10, 1972. A modified lignin may be made according to the Falkehag patent by reacting an alkaline solution of alkali lignin with from 0.17 to 2.0 moles of hexamethylene tetramine per mole of alkali lignin at a temperature between 70° and 180°C. to form a water insoluble modified lignin.

The carbon particles are thoroughly mixed with the lignin binder using any convenient mixing means as long as thorough mixing is obtained. The mixture generally agglomerates best when there is present 70% of the total weight of the composition (mixture) as water. Additional water may be added to bring the mixture to the correct proportions. The mixing is continued until the particle agglomerates to about 1/16 to ¼ inch diameter spheres.

After agglomeration occurs, the water of solution is driven off, either by drying in air or by the aid of heat such as in a forced air convection furnace. The dried products may then be used as is or subjected to further heating and processing. For instance, further heating and extruding may produce rods, sheets or other useful forms of an activated carbon having satisfactory strength and abrasion properties. The heating produces a coalesced thermoplastic binder which gives the desired properties. Pressure may also be used. Also the dried agglomerated particles may be crushed to the size of conventionally used granular products and used for the same purposes. The drying conditions are not critical limitations, for those skilled in the art will recognize that many combinations of temperature and/or pressure may be used to suit the particular binder and carbon particle.

The invention is described in greater detail with the aid of the following examples.

EXAMPLE 1

A solution of ammonium lignate binder was prepared by slurrying 4 pounds or precipitated ammonium salt of alkaline digested lignin with 16 pounds of water and slowly adding 2.08 pounds of ammonium hydroxide. The solids content was 17%. This binder was added to activated carbon particles at various binder levels with water in a Hobart blender until pelletizing occurred. The carbon particles prior to pelletizing were compared to normal granular activated carbon and had the following physical properties:

| Type Carbon | Density lbs./ft.$^3$ | Iodine Value | Molasses Value | Particle Size Analysis,% by weight | | | | | | |
|---|---|---|---|---|---|---|---|---|---|---|
| | | | | +8M | 8×30 | 30×60 | 50×100 | 100×200 | 200×325 | −325 |
| Granular | 10.8 | 89.3 | 60 | 1.2 | 42.6 | 42.5 | 10.1 | 5.1 | — | — |
| Dust | — | 93.5 | 157 | — | — | — | 0.07 | 0.10 | 1.16 | 98.67 |

The formulations for carboin particle-binder mixtures are shown in the table below:

| Sample | Percent Binder | Weight Dust,g. | Wt. Ammonium Lignate Sol. | Total Weight Water Added | Total* Weight H$_2$O | Percent H$_2$O |
|---|---|---|---|---|---|---|
| 1 | 5 | 100 | 30.7 | 270 g. | 295.4 | 73.8 |
| 2 | 10 | 100 | 64.6 | 250 g. | 304.3 | 73.8 |
| 3 | 20 | 100 | 145.5 | 180 g. | 300.5 | 71.2 |

*includes water in the binder.

The carbon dust was found to pelletize quite well at water loading above 70%. Most of the pellets were in the 1/16 to ¼ inch diameter range. The total sample, larger than 30 mesh was estimated to be better than 95%. The level of ammonium lignate binder did not seem to effect the pelletizing characteristics.

EXAMPLE 2

After pelletizing, the samples from Example 1 were dried in a forced air convection furnace. Each sample was crushed through an 8 mesh screen to get the material to the same relative particle size as granular activated carbon particles. The dried and crushed samples of lignin binder carbon particles were each heat treated at 1,600°F. under a nitrogen blanket for about 2 minutes in a 4 inch diameter rotary furnace to devolatize the binder.

To investigate the degree of abrasion that would result if the carbon particle-lignin binder samples were passed through a high temperature fluidized bed furnace, the heat treated material was fluidized in a 4 inch diameter column at about the same residence time and gas velocity found in the high temperature furnace. Prior to the fluid bed treatment each sample was screened to a nominal 8×30 mesh particle size distribution, and all −60 mesh fines were removed. Retention times of 5 and 10 minutes were used. A sample of normal granular activated carbon was run for comparison. The gas velocity through the fluid bed was 0.96 ft./sec. at a bed temperature of 70°F. The results were:

| Sample | Percent Fines (−60 Mesh) Retention time 5 minutes | 10 minutes |
|---|---|---|
| Normal granular | 3 | 5 |
| Dust at 5% binder level | 55 | 73 |
| Dust at 10% binder level | 22 | 36 |
| Dust at 20% binder level | 6 | 9 |

At the 20% ammonium lignate binder levels the amount of fines (−60 M) was only twice that of normal granular particles.

EXAMPLE 3

This example illustrates the effect of surface area reduction of dedusted activated carbon particles coated with a lignin binder. Two samples of WESTVACO NU-CHAR B-100-N, having a mesh of 12 × 30 were added at 5 parts and 10 parts per 100 parts carbon of lignin binder. The procedure was as follows: 75 grams of the activated carbon particles were mixed in a Hobart N-2 blender with a solution of hexamethylene tetramine modified lignin, 42 grams at 17.8% solids. After 5 minutes of mixing, 100 grams of water were added and the mixing continued until small spheres of agglomerated carbon were formed. The wet mass was dried in a forced air convection oven at 230°F. for 4 hours. The surface area of each sample was determined by the BET method and compared to a control sample.

| Carbon Sample | Surface Area M²/gm. |
|---|---|
| Control | 571 |
| Agglomerated Dust at 5 parts loading | 526 |
| Agglomerated Dust at 10 parts binder loading | 480 |

These results indicate that a hexamethylene tetramine modified lignin binder acts effectively as a binder at 5 and 10 parts binder per 100 parts of carbon particles loading levels with decreases in surface area of only 7.8% and 15.9% respectively.

It should be understood, however that the detailed description and specific examples set forth hereinabove while indicating preferred embodiments of this invention are given by way of illustration only, since various changes and modifications within the spirit and scope of the invention will become readily apparent to those skilled in the art.

What is claimed is:

1. Activated powdered carbon particles agglomerated with a water-insoluble ammonium salt of alkali lignin in an amount of 2 to 25% by weight based on the carbon.

2. Activated carbon particles according to claim 1 wherein said ammonium salt of lignin is present in an amount of 10 to 20% by weight of powdered carbon particles.

3. Activated powdered carbon particles agglomerated with an alkali lignin obtained by reacting an alkaline solution of alkali lignin with from 0.17 to 2.0 moles of hexamethylene tetramine per mole of lignin at a temperature between 70°C. and 180°C., said lignin dried to form products having large surface areas present in an amount of from 2 to 25% by weight based on a powdered carbon.

4. Activated carbon particles according to claim 3 wherein said alkali lignin is present in an amount of 10 to 20% by weight of said powdered carbon.

5. A method of producing activated carbon particles which comprises;
   a. adding powdered activated carbon particles to water containing from 2 to 25% by weight of said powdered carbon of the ammonium salt of an alkali lignin, said water being at least 70% by weight based on said lignin and said carbon together,
   b. intimately mixing said powdered carbon particles, ammonium salt of alkali lignin and water to coat each powdered carbon particle with said ammonium salt of alkali lignin,
   c. continuing said mixing until said powdered carbon particles form agglomerates of about 1/16 to ¼ inch diameter spheres, and
   d. evaporating the water from said agglomerates at a temperature below the decomposition temperature of said ammonium salt of alkali lignin.

6. The method of claim 5 which further comprises,
   e. heating said agglomerates from which the water has been evaporated in step (d) above the decomposition temperature of said ammonium salt of alkali lignin thereby to decompose the ammonium salt of alkali lignin into ammonia and a free acid alkali lignin bound carbon agglomerate, and
   f. separating said ammonia from said free acid alkali lignin bound agglomerate.

* * * * *

UNITED STATES PATENT OFFICE
CERTIFICATE OF CORRECTION

PATENT NO. : 3,901,823
DATED : August 26, 1975
INVENTOR(S) : Mitchell S. Dimitri and Albert J. Repik It is certified that error appears in the above-identified patent and that said Letters Patent are hereby corrected as shown below:

Column 1, line 18, after the word "desirable" insert --to--.

Column 4, line 19, "or" should read --of--.

Column 4, line 31, in the first table heading, "50x100" should read --60x100--.

Signed and Sealed this ninth Day of December 1975

[SEAL]

Attest:

RUTH C. MASON
Attesting Officer

C. MARSHALL DANN
Commissioner of Patents and Trademarks